US012372890B2

(12) United States Patent
Saeki et al.

(10) Patent No.: US 12,372,890 B2
(45) Date of Patent: Jul. 29, 2025

(54) TONER MANUFACTURING METHOD AND TONER

(71) Applicant: FUJIFILM Business Innovation Corp., Tokyo (JP)

(72) Inventors: Yuta Saeki, Kanagawa (JP); Takahiro Yamashita, Kanagawa (JP); Kazuhiko Nakamura, Kanagawa (JP); Yuji Isshiki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 415 days.

(21) Appl. No.: 17/504,469

(22) Filed: Oct. 18, 2021

(65) Prior Publication Data

US 2022/0390863 A1 Dec. 8, 2022

(30) Foreign Application Priority Data

May 25, 2021 (JP) ................................ 2021-087938

(51) Int. Cl.
*G03G 9/08* (2006.01)

(52) U.S. Cl.
CPC ......... *G03G 9/0817* (2013.01); *G03G 9/0821* (2013.01)

(58) Field of Classification Search
CPC ........................... G03G 9/0817; G03G 9/0821
See application file for complete search history.

(56) References Cited

U.S. PATENT DOCUMENTS

| | | | | |
|---|---|---|---|---|
| 9,904,196 B1 * | 2/2018 | Yoshida | G03G 9/0926 | |
| 2010/0081078 A1 * | 4/2010 | Kurokawa | G03G 9/0804 | 430/137.1 |
| 2013/0078565 A1 * | 3/2013 | Yoshida | G03G 9/08795 | 399/168 |
| 2013/0295499 A1 * | 11/2013 | Murata | G03G 9/08755 | 430/105 |
| 2014/0199626 A1 * | 7/2014 | Itou | G03G 9/0815 | 430/111.4 |

FOREIGN PATENT DOCUMENTS

| | | | |
|---|---|---|---|
| JP | 2000010341 | | 1/2000 |
| JP | 2000010341 A | * | 1/2000 |
| JP | 2002221823 | | 8/2002 |
| JP | 2008241873 A | * | 10/2008 |
| JP | 2011145508 | | 7/2011 |
| JP | 2013025093 | | 2/2013 |
| JP | 2014073480 A | * | 4/2014 |

OTHER PUBLICATIONS

English machine translation of the description of JP-2000010341-A (Year: 2000).*

"Room temperature." Merriam-Webster.com Dictionary, Merriam-Webster, https://www.merriam-webster.com/dictionary/room%20temperature. Accessed Mar. 25, 2024. (Year: 2024).*

"Room Temperature, N." Oxford English Dictionary, Oxford UP, Mar. 2024, https://doi.org/10.1093/OED/1291472808. (Year: 2024 ).*

English machine translation of the description of JP-2014073480-A (Year: 2014).*

English machine translation of the description of JP-2008241873-A (Year: 2008).*

"Notice of Reasons for Refusal of Japan Counterpart Application", issued on Mar. 4, 2025, with English translation thereof, pp. 1-6.

"Office Action of Japan Counterpart Application", issued on Oct. 15, 2024, with English translation thereof, p. 1-p. 9.

* cited by examiner

*Primary Examiner* — Mark F. Huff
*Assistant Examiner* — Boone Alexander Evans
(74) *Attorney, Agent, or Firm* — JCIPRNET

(57) ABSTRACT

A toner manufacturing method includes a first step of filtering toner particles obtained by a wet manufacturing method, a second step of squeezing the toner particles and making water pass through the toner particles, and a third step of squeezing the toner particles and ventilating compressed air through the toner particles, in which Condition (1) and Condition (2) are satisfied, Condition (1): a temperature T of the water passing through the toner particles in the second step satisfies "10° C.≤T≤35° C."; and Condition (2): a squeezing pressure P1 in the second step and a squeezing pressure P2 in the third step satisfy "0.2 MPa≤P1<P2≤0.8 MPa".

10 Claims, No Drawings

TONER MANUFACTURING METHOD AND TONER

CROSS-REFERENCE TO RELATED APPLICATIONS

This application is based on and claims priority under 35 USC 119 from Japanese Patent Application No. 2021-087938 filed May 25, 2021.

BACKGROUND

(i) Technical Field

The present invention relates to a toner manufacturing method and a toner.

(ii) Related Art

JP2002-221823A suggests "a polymerization method toner manufacturing method of salting-out and fusing at least resin fine particles in an aqueous medium to form colored particles and filtering and drying the colored particles in the aqueous medium, in which a filter press method is used in a step of filtering the colored particles in the aqueous medium".

JP2000-010341A suggests "a polymerizable toner particle manufacturing method of polymerizing a polymerizable monomer composition containing at least a polymerizable monomer and a colorant in a liquid medium to generate colored resin particles, separating the colored resin particles from the liquid medium by filtration, and drying the filtered particles to manufacture polymerization toner particles, in which the separation of the colored resin particles from the liquid medium by filtration is performed by a filter press method".

SUMMARY

Aspects of non-limiting embodiments of the present disclosure relate to a toner manufacturing method of manufacturing a toner with excellent charge stability and high transfer efficiency, as compared with a toner manufacturing method including a first step of filtering toner particles obtained by a wet manufacturing method, a second step of squeezing the toner particles and making water pass through the toner particles, and a third step of squeezing the toner particles and ventilating compressed air through the toner particles, in which a temperature T of the water passing through the toner particles in the second step satisfies "10° C.>T" or "T>35° C.", a squeezing pressure P1 and a squeezing pressure P2 are less than 0.2 mPa, the squeezing pressure P1 and the squeezing pressure P2 are or more than 0.8 MPa, or a relationship of "P1≥P2" is satisfied.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The above-described object is achieved by the following means.

According to an aspect of the present disclosure, there is provided a toner manufacturing method including: a first step of filtering toner particles obtained by a wet manufacturing method; a second step of squeezing the toner particles and making water pass through the toner particles; a third step of squeezing the toner particles and ventilating compressed air through the toner particles, and in which Condition (1) and Condition (2) are satisfied, Condition (1): a temperature T of the water passing through the toner particles in the second step satisfies "10° C.≤T≤35° C."; and Condition (2): a squeezing pressure P1 in the second step and a squeezing pressure P2 in the third step satisfy "0.2 MPa≤P1<P2≤0.8 MPa".

DETAILED DESCRIPTION

Hereinafter, exemplary embodiments that are examples of the present invention will be described. The following descriptions and examples merely illustrate the exemplary embodiments, and do not limit the scope of the exemplary embodiments.

In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in the numerical range may be replaced with a value shown in an example.

Each component may include a plurality of kinds of substances corresponding to each component.

In a case where a plurality of kinds of substances corresponding to each component in a composition are present, the amount of each component in the composition indicates the total amount of the plurality of kinds of substances present in the composition unless otherwise specified.

Toner Manufacturing Method

A toner manufacturing method according to the present exemplary embodiment includes a first step of filtering toner particles obtained by a wet manufacturing method, a second step of squeezing the toner particles and making water pass through the toner particles, and a third step of squeezing the toner particles and ventilating compressed air through the toner particles, in which Condition (1) and Condition (2) are satisfied.

Condition (1): A temperature T of the water passing through the toner particles in the second step satisfies "10° C.≤T≤35° C.".

Condition (2): A squeezing pressure P1 in the second step and a squeezing pressure P2 in the third step satisfy "0.2 MPa≤P1<P2≤0.8 MPa".

With the above-described configuration, the toner manufacturing method according to the present exemplary embodiment is a toner manufacturing method of manufacturing a toner having excellent charge stability and high transfer efficiency. The reason for this is assumed as follows.

As means for intentionally controlling the shape of the toner particles and the surface structure of the toner particles, a method of manufacturing the toner particles by a wet manufacturing method is used. Toner particles manufactured by a wet manufacturing method require a cleaning step in order to remove impurities (for example, ions) attached to the toner particles. Examples of the method of cleaning toner particles include a method of using a pressure filter such as a filter press. Examples of the method of cleaning toner particles using a filter press include a method of squeezing toner particles manufactured by a wet manufacturing method and ventilating air through the toner particles. However, in a case where the toner particles are cleaned using a pressure filter, a part of impurities attached to the toner particles may easily remain, and the remaining may cause deterioration of the toner charge stability and the transfer efficiency.

In the toner manufacturing method according to the present exemplary embodiment, in the second step of squeezing the toner particles and making water pass through the toner particles, the temperature T of the water passing through the toner particles satisfies "10° C.≤T≤35° C.". By setting the temperature T of the water passing through the toner particles to 10° C. or higher, impurities attached to the toner particles are more likely to be removed by the passing water. In this manner, the obtained toner has excellent charge stability. Further, by setting the temperature T of the water passing through the toner particles to 35° C. or lower, peeling of the surface of the toner particle due to the passing water can be suppressed. In this manner, charge injection during the transfer due to the peeling of the surface of the toner particle is suppressed, and thus the transfer efficiency of the toner to be obtained is increased.

Further, in the toner manufacturing method according to the present exemplary embodiment, the pressing pressure P1 in the second step and the pressing pressure P2 in the third step satisfy "0.2 MPa≤P1<P2≤0.8 MPa". By setting the squeezing pressure P1 and the squeezing pressure P2 to 0.2 MPa or more, an almost uniform pressure is likely to be applied to the entire toner particles in a case of squeezing the toner particles. Therefore, the entire toner particles are easily cleaned. Further, by setting the squeezing pressure P2 to be larger than the squeezing pressure P1, the moisture contained in the toner particles can be easily removed. Therefore, impurities contained in the toner particles can be more easily removed.

Further, by setting the squeezing pressure P1 and the squeezing pressure P2 to 0.8 MPa or less, the pressure applied to the toner in a case of squeezing the toner particles is not extremely increased, and thus the deformation of the toner particles is suppressed. In this manner, deterioration of the transfer efficiency due to the deformation of the toner particles is suppressed.

As described above, the toner manufacturing method according to the present exemplary embodiment is assumed to be a toner manufacturing method having excellent charge stability and high transfer efficiency.

First Step

The first step is a step of filtering the toner particles before cleaning obtained by the wet manufacturing method.

Here, the toner particles before the second step and the third step are referred to as "pre-cleaning toner particles".

Pre-Cleaning Toner Particles

The pre-cleaning toner particles are pre-cleaning toner particles manufactured by a wet manufacturing method.

Examples of the wet manufacturing method include an aggregation and coalescence method, a suspension polymerization method, and a dissolution suspension method.

Among these, the pre-cleaning toner particles may be obtained by, for example, the aggregation and coalescence method.

The method of manufacturing the pre-cleaning toner particles by the aggregation and coalescence method will be described below as an example.

Specifically, for example, in a case where the pre-cleaning toner particles are manufactured by the aggregation and coalescence method, the pre-cleaning toner particles are manufactured by performing a step of preparing a resin particle dispersion liquid in which resin particles serving as a binder resin are dispersed (resin particle dispersion liquid preparation step), a step of allowing the resin particles (other particles as necessary) to be aggregated in the resin particle dispersion liquid (in the dispersion liquid which has been mixed with other particle dispersion liquid as necessary) to form aggregated particles (aggregated particle formation step), a step of heating the aggregated particle dispersion liquid in which the aggregated particles are dispersed and fusing and coalescing the aggregating particles to form pre-cleaning toner particles (fusion and coalescence step), and a step of removing coarse particles (sieving step).

The details of each step will be described below.

Further, in the following description, a method of obtaining pre-cleaning toner particles containing a colorant and a release agent will be described, but the colorant and the release agent are used as necessary. It is needless to say that additives other than the colorant and the release agent may be used.

Resin Particle Dispersion Liquid Preparation Step

First, for example, a colorant particle dispersion liquid in which the colorant particles are dispersed and a release agent particle dispersion liquid in which the release agent particles are dispersed are prepared together with the resin particle dispersion liquid in which the resin particles serving as the binder resin are dispersed.

Here, the resin particle dispersion liquid is prepared, for example, by allowing the resin particles to be dispersed in a dispersion medium using a surfactant.

Examples of the dispersion medium used in the resin particle dispersion liquid include an aqueous medium.

Examples of the aqueous medium include water such as distilled water or ion exchange water and alcohols. The aqueous medium may be used alone or in combination of two or more kinds thereof.

Examples of the surfactant include an anionic surfactant based on a sulfuric acid ester salt, a sulfonate, a phosphoric acid ester salt, soap, and the like; a cationic surfactant such as an amine salt type cationic surfactant and a quaternary ammonium salt type cationic surfactant; a nonionic surfactant based on polyethylene glycol, an alkylphenol ethylene oxide adduct, and a polyhydric alcohol, and the like. Among these, particularly, an anionic surfactant and a cationic surfactant may be exemplified. A nonionic surfactant may be used in combination with an anionic surfactant or a cationic surfactant.

The surfactant may be used alone or in combination of two or more kinds thereof.

Examples of the method of allowing the resin particles to be dispersed in the dispersion medium in the resin particle dispersion liquid include typical dispersion methods such as a rotary shear homogenizer, a ball mill having a medium, a sand mill, and a dyno mill. Further, depending on the kind of resin particles, the resin particles may be dispersed in a resin particle dispersion medium by a phase inversion emulsification method.

Further, the phase inversion emulsification method is a method of dissolving the resin to be dispersed in a hydrophobic organic solvent in which the resin is soluble, adding a base to an organic continuous phase (O phase) for neutralization, adding an aqueous medium (W phase thereto, performing conversion of the resin (so-called phase inversion) from W/O to O/W to obtain a discontinuous phase, and dispersing the resin in the aqueous medium in the form of particles.

The volume average particle diameter of the resin particles to be dispersed in the resin particle dispersion liquid is, for example, preferably 0.01 μm or more and 1 μm or less, more preferably 0.04 μm or more and 0.8 μm or less, and still more preferably 0.06 μm or more and 0.6 μm or less.

Further, the volume average particle diameter of the resin particles is obtained by drawing cumulative distribution of the volume from the small diameter side for each divided particle size range (channel) and measuring the particle diameter at a cumulative 50% as the volume average particle diameter D50v with respect to the entirety of the particles, using the particle size distribution obtained by performing measurement with a laser diffraction type particle size distribution measuring device (for example, LA-700, manufactured by Horiba, Ltd.). Further, the volume average particle diameter of the particles in another dispersion liquid is measured in the same manner as described above.

The content of the resin particles contained in the resin particle dispersion liquid is, for example, preferably 5% by mass or more and 50% by mass or less and more preferably 10% by mass or more and 40% by mass or less.

In addition, similar to the resin particle dispersion liquid, for example, the colorant particle dispersion liquid and the release agent particle dispersion liquid are also prepared. That is, the same applies to the colorant particles to be dispersed in the colorant particle dispersion liquid and the release agent particles to be dispersed in the release agent particle dispersion liquid in terms of the volume average particle diameter of particles in the resin particle dispersion liquid, the dispersion medium, the dispersion method, and the content of the particles.

Aggregated Particle Formation Step

Next, the resin particle dispersion liquid, the colorant particle dispersion liquid, and the release agent particle dispersion liquid are mixed.

Further, the resin particles, the colorant particles, and the release agent particles are heteroaggregated in the mixed dispersion liquid to form aggregated particles including the resin particles, the colorant particles, and the release agent particles, which have a diameter close to the diameter of the target pre-cleaning toner particles.

Specifically, for example, the aggregated particles are formed by adding an aggregating agent to the mixed dispersion liquid, adjusting the pH of the mixed dispersion liquid to be acidic (for example, a pH of 2 or more and 5 or less), adding a dispersion stabilizer thereto as necessary, heating the solution to the glass transition temperature of the resin particles (specifically, for example, a temperature higher than or equal to the glass transition temperature of the resin particles—30° C. and lower than or equal to the glass transition temperature thereof—10° C.) and allowing the particles dispersed in the mixed dispersion liquid to be aggregated.

In the aggregated particle formation step, for example, the heating may be performed after the mixed dispersion liquid is stirred with a rotary shear homogenizer, the aggregating agent is added thereto at room temperature (for example, 25° C.), the pH of the mixed dispersion liquid is adjusted to be acidic (for example, a pH of 2 or more and 5 or less), and the dispersion stabilizer is added thereto as necessary.

Examples of the aggregating agent include a surfactant having a polarity opposite to the polarity of the surfactant used as a dispersant to be added to the mixed dispersion liquid, an inorganic metal salt, and a divalent or higher valent metal complex. Particularly, in a case where a metal complex is used as the aggregating agent, the amount of the surfactant to be used is reduced, and the charging characteristics are improved.

An additive that forms a complex or a bond similar to the complex with a metal ion of the aggregating agent may be used as necessary. A chelating agent is used as the additive.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent to be added is, for example, preferably 0.01 parts by mass or more and 5.0 parts by mass or less and more preferably 0.1 parts by mass or more and less than 3.0 parts by mass with respect to 100 parts by mass of the resin particles.

Fusion and Coalescence Step

Next, the aggregated particle dispersion liquid in which the aggregated particles are dispersed is heated to, for example, a temperature higher than or equal to the glass transition temperature of the resin particles (for example, a temperature higher than the glass transition temperature of the resin particles by 10° C. to 30° C.) and the aggregated particles are fused and coalesced, thereby forming pre-cleaning toner particles.

Sieving Step

The coarse particles in the suspension solution are removed by allowing the suspension solution (slurry) containing the pre-cleaning toner particles to pass through, for example, a net.

Here, the opening size of the net is appropriately adjusted according to the particle diameter of the pre-cleaning toner particles. For example, the value of the opening size (unit: μm) [D50v/opening size] with respect to the volume average particle diameter D50v (unit: μm) of the pre-cleaning toner particles is, for example, preferably 2 or more and 6 or less and more preferably 3 or more and 5 or less.

The pre-cleaning toner particles are obtained by performing the above-described steps.

Further, the pre-cleaning toner particles may be manufactured by performing a step of obtaining the aggregated particle dispersion liquid in which the aggregated particles are dispersed, further mixing the aggregated particle dispersion liquid with the resin particle dispersion liquid in which the resin particles are dispersed, and allowing the resin particles to be aggregated such that the resin particles are further attached to the surface of each aggregated particle to form second aggregated particles and a step of heating the second aggregated particle dispersion liquid in which the second aggregated particles are dispersed and fusing and coalescing the second aggregated particle to form pre-cleaning toner particles having a core-shell structure.

Filtration

In the first step, the pre-cleaning toner particles obtained by the above-described method are filtered.

Examples of the method of filtering the pre-cleaning toner particles include vacuum filtration, centrifugal filtration, and pressure filtration.

From the viewpoint of the filtration efficiency, for example, pressure filtration is preferable as the method of filtering the pre-cleaning toner particles.

From the viewpoint of the filtration efficiency, it is preferable that the pressure filtration is performed using, for example, a filter press.

In a case where the filtration is performed using a filter press, specifically, it is preferable that the pressure filtration is performed by, for example, adding a suspension solution (slurry) containing the pre-cleaning toner particles to a filter chamber of the filter press and pressurizing the filter chamber.

The pressure applied to the pre-cleaning toner particles in a case of filtering the pre-cleaning toner particles is, for example, preferably 0.2 MPa or more and 0.7 MPa or less, more preferably 0.3 MPa or more and 0.6 MPa or less, and still more preferably 0.3 MPa or more and 0.5 MPa or less.

It is preferable that the conditions for the filter press are set, for example, as follows.

Filtration area: 30 $m^2$ or more and 200 $m^2$ or less

Volume of filter chamber: 0.5 $m^3$ or more and 5 $m^3$ or less

Thickness of filter chamber: 20 mm or more and 50 mm or less

Ventilation volume of filter at 12 Pa: 0.1 $cm^3/cm^2 \cdot s$ or more and 0.5 $cm^3/cm^2 \cdot s$ or less In a case where the filtration is performed using a filter press, the amount of the pre-cleaning toner particles in the suspension solution containing the pre-cleaning toner particles is, for example, preferably 5% by mass or more and 30% by mass or less, more preferably 7% by mass or more and 25% by mass or less, and still more preferably 10% by mass or more and 20% by mass or less with respect to the entire suspension solution.

Second Step

The second step is a step of squeezing the pre-cleaning toner particles and making water pass through the pre-cleaning toner particles.

Squeezing

The pre-cleaning toner particles after the filtration obtained in the first step are squeezed.

The squeezing pressure P1 is, for example, preferably 0.2 MPa or more and 0.7 MPa or less, more preferably 0.3 MPa or more and 0.6 MPa or less, and still more preferably 0.3 MPa or more and 0.5 MPa or less.

It is preferable that the pre-cleaning toner particles are squeezed using, for example, a filter press.

It is preferable that the conditions for the filter press are, for example, the same as the conditions described in the section of the first step.

Passing Water

Water is made to pass through the squeezed pre-cleaning toner particles.

For example, a method of making water pass through a pipe connected to the filter chamber is preferable as the method for the passing water.

The passing water is not particularly limited, and ion exchange water, ultrapure water, distilled water, ultrafiltered water, or the like is used, but from the viewpoint of reducing the amount of ions remaining in the pre-cleaning toner particles, for example, at least one of ion exchange water or ultrapure water is preferably used.

Further, in a case where the conductivity of the filtrate recovered by passing water in the second step is 0.05 mS/cm or less, the filtrate may be passed through.

Water is made to pass through the particles until the conductivity of the filtrate reaches, for example, preferably 0.10 mS/cm or less, more preferably 0.08 mS/cm or less, and still more preferably 0.05 mS/cm or less.

From the viewpoint of improving the manufacturing efficiency, water may be made to pass through the particles until the conductivity of the filtrate reaches 0.01 mS/cm or more.

The impurities remaining in the pre-cleaning toner particles are further reduced by making water pass through the particles until the conductivity of the filtrate is set to be in the above-described numerical range. Therefore, the charge stability of the toner to be obtained is more excellent.

The conductivity is a value measured by a conductivity meter.

As the conductivity meter, for example, MPC227 (pH/Conductivity Meter, manufactured by Mettler-Toledo International Inc.) can be used.

The amount of the passing water is, for example, preferably 600 parts by mass or more, more preferably 800 parts by mass or more, and still more preferably 1000 parts by mass or more with respect to 100 parts by mass of the pre-cleaning toner particles.

The impurities remaining in the pre-cleaning toner particles are further reduced by setting the amount of the passing water through to be in the above-described numerical range. Therefore, the charge stability of the toner to be obtained is more excellent.

Further, from the viewpoint of improving the manufacturing efficiency, the amount of the passing water through may be 2000 parts by mass or less, 1900 parts by mass or less, or 1800 parts by mass with respect to 100 parts by mass of the pre-cleaning toner particles.

The temperature T of the passing water satisfies "$10° C. \leq T \leq 35° C.$".

From the viewpoint of further improving the charge stability of the toner to be obtained, the temperature T of the passing water satisfies, for example, preferably "$12° C. \leq T \leq 33° C.$", more preferably "$14° C. \leq T \leq 31° C.$", and still more preferably "$16° C. \leq T \leq 29° C.$".

Third Step

The third step is a step of squeezing the pre-cleaning toner particles and ventilating compressed air through the pre-cleaning toner particles.

Squeezing

The pre-cleaning toner particles, through which water has been made to pass, to be obtained in the second step are squeezed.

The pressing pressure P2 is, for example, preferably 0.3 MPa or more and 0.8 MPa or less, more preferably 0.4 MPa or more and 0.7 MPa or less, and still more preferably 0.5 MPa or more and 0.7 MPa or less.

It is preferable that the pre-cleaning toner particles are squeezed using, for example, a filter press.

It is preferable that the conditions for the filter press are, for example, the same as the conditions described in the section of the first step.

Ventilation

Compressed air is ventilated through the squeezed pre-cleaning toner particles.

For example, a method of ventilating compressed air through a pipe connected to the filter chamber is preferable as the method of ventilating compressed air.

The ventilation time is, for example, preferably 60 seconds or longer, more preferably 80 seconds or longer, and still more preferably 100 seconds or longer.

Further, from the viewpoint of improving the manufacturing efficiency, the ventilation time may be 900 seconds or shorter.

By setting the ventilation time to 60 seconds or longer, excess moisture is easily removed from the pre-cleaning toner particles contained in the filter chamber, and the impurities contained in the pre-cleaning toner particles is more easily reduced. Therefore, the charge stability of the toner to be obtained is further improved.

The pressure of the compressed air is set to be, for example, preferably 0.2 MPa or more and 0.6 MPa or less, more preferably 0.3 MPa or more and 0.6 MPa or less, and still more preferably 0.3 MPa or more and 0.5 MPa or less.

By setting the pressure of the compressed air to be in the above-described range, excess moisture is easily removed from the pre-cleaning toner particles contained in the filter chamber, and the impurities contained in the pre-cleaning toner particles is more easily reduced. Therefore, the charge stability of the toner to be obtained is further improved.

It is preferable that the compressed air is ventilated, for example, a plurality of times.

Here, it is preferable that the ventilation time per one ventilation and the pressure of the compressed air are set, for example, as described above.

By ventilating the compressed air a plurality of times, excess moisture is easily removed from the pre-cleaning toner particles contained in the filter chamber, and the impurities contained in the pre-cleaning toner particles is more easily reduced. Therefore, the charge stability of the toner to be obtained is further improved.

Compressed air is ventilated through the pre-cleaning toner particles, and the amount of moisture contained in the pre-cleaning toner particles is set to, for example, preferably 45% by mass or less, more preferably 43% by mass or less, and still more preferably 40% by mass with respect to the entirety of the pre-cleaning toner particles.

Here, from the viewpoint of improving the manufacturing efficiency, compressed air is ventilated through the pre-cleaning toner particles, and the amount of moisture contained in the pre-cleaning toner particles may be set to 25% by mass or more with respect to the entirety of the pre-cleaning toner particles.

By ventilating the compressed air through the pre-cleaning toner particles and setting the amount of moisture contained in the pre-cleaning toner particles to 45% by mass or less with respect to the entirety of the pre-cleaning toner particles, excess moisture is easily removed from the pre-cleaning toner particles contained in the filter chamber, and the impurities contained in the pre-cleaning toner particles is more easily reduced. Therefore, the charge stability of the toner to be obtained is further improved.

Here, the amount of moisture contained in the pre-cleaning toner particles after the ventilation is measured in the following manner.

3 g of the pre-cleaning toner particles after the ventilation is measured with a heat-drying type moisture meter (product name: ML-50, manufactured by A & D Co., Ltd.).

Relationship Between Squeezing Pressure P1 and Squeezing Pressure P2

The squeezing pressure P1 in the second step and the squeezing pressure P2 in the third step satisfy "$0.2\ \text{MPa} \leq P1 < P2 \leq 0.8\ \text{MPa}$". From the viewpoint of obtaining a toner having more excellent charge stability and higher transfer efficiency, a difference (P2−P1) between the squeezing pressure P1 in the second step and the squeezing pressure P2 in the third step is, for example, preferably 0.05 MPa or more and 0.4 MPa or less, more preferably 0.1 MPa or more and 0.35 MPa or less, and still more preferably 0.1 MPa or more and 0.3 MPa or less.

Drying Step

For example, it is preferable that a step of drying the toner particles is provided after the third step.

The drying step is not particularly limited, but from the viewpoint of the productivity, for example, freeze-drying, flush drying, fluidized drying, vibratory fluidized drying, or the like may be performed as the drying step.

Toner particles are manufactured by performing the above-described steps.

Manufacture of Toner

External Addition Step

In a case where the toner contains an external additive, the toner is obtained by manufacturing the toner particles and externally adding the external additive to the toner particles.

The external addition step is, for example, a step of adding an external additive to the obtained toner particles in a dry state and mixing the external additive with the toner particles. The mixing may be performed, for example, using a V blender, a Henschel mixer, a Lodige mixer, or the like. Further, coarse particles of the toner may be removed as necessary using a vibratory sieving machine, a pneumatic sieving machine, or the like.

In the toner manufacturing method according to the present exemplary embodiment, it is preferable to obtain a toner in which the content of ammonium ions to be measured by the procedure described below is, for example, 1.0 mg/L or less, and in fluorescent X-ray analysis, the Net intensity of the Na element is, for example, 0.50 kcps or less, and the Net intensity of the S element is, for example, 1.5 kcps or less.

The reason for this will be described below, but the toner in which the content of ammonium ions, the Net intensity of the Na element, and the Net intensity of the S element are respectively in the above-described range is a toner having excellent charge stability and high transfer efficiency. Therefore, by employing the toner manufacturing method for obtaining the above-described toner, a toner manufacturing method of manufacturing a toner having more excellent charge stability and higher transfer efficiency is likely to be obtained.

The methods of measuring the content of ammonium ions, the Net intensity of the Na element, and the Net intensity of the S element will be described below.

Toner

In the toner according to the present exemplary embodiment, the content of ammonium ions to be measured by the procedure described below is 1.0 mg/L or less, and in the fluorescent X-ray analysis, the Net intensity of the Na element is 0.50 kcps or less, and the Net intensity of the S element is 1.50 kcps or less.

By employing the above-described configuration for the toner according to the present exemplary embodiment, a toner having excellent charge stability and higher transfer efficiency is obtained. The reason for this is assumed as follows.

By setting the content of ammonium ions to 1.0 mg/L or less, the charge amount of the toner tends to be in an appropriate range in image formation in a low-temperature and low-humidity environment. Further, by setting the Net intensity of the Na element in the fluorescent X-ray analysis to 0.50 kcps or less, the charge amount of the toner tends to be in an appropriate range in image formation in a high-temperature and high-humidity environment. Accordingly, the toner according to the present exemplary embodiment has excellent charge stability.

Further, by setting the Net intensity of the S element to 1.50 kcps or less, transfer defects are likely to be suppressed. Therefore, the toner according to the present exemplary embodiment has high transfer efficiency.

Based on the description above, it is assumed that the toner according to the present exemplary embodiment is a toner having excellent charge stability and higher transfer efficiency.

Content of Ammonium Ions

The content of ammonium ions is 1.0 mg/L or less. From the viewpoint of further improving the charge stability in a low-temperature and low-humidity environment, the content of ammonium ions is, for example, preferably 0.9 mg/L or less, more preferably 0.8 mg/L or less, and still more preferably 0.7 mg/L or less.

The content of ammonium ions is, for example, most preferably 0.0 mg/L, but may be, for example, 0.1 mg/L or more from the viewpoint of improving the manufacturing efficiency of the toner.

The content of the ammonium ions is measured in the following manner.

0.5 g of toner particles are weighed, dispersed in 100 g of ion exchange water containing 0.1 g of a nonionic surfactant (for example, NONIPOL 10, manufactured by Sanyo Chemical Industries, Ltd.) corresponding to 20% by mass with respect to the entirety of the toner particles, and dispersed for 30 minutes with an ultrasonic disperser in a thermostatic bath controlled to have a temperature of 30±1° C. The liquid after the ultrasonic dispersion is subjected to solid-liquid separation by suction filtration to remove the toner particles, the amount of ammonium contained in the obtained filtrate is measured by ion chromatography. The analysis is performed under the following conditions using ICS-2000 (manufactured by Nippon Dionex K. K.) as the ion chromatography.

Cation separation column: IonPacCS12A, manufactured by Nippon Dionex K. K.

Cation guard column: IonPacCG12A, manufactured by Nippon Dionex K. K.

Eluent: 20 mM (mmol/l) of methanesulfonic acid

Flow rate: 1 ml/min

Temperature: 30° C.

Detection Method: Electrical Conductivity Method (Suppressor Type)

Examples of the supply source of ammonium ions include cationic surfactants such as ammonia and a quaternary ammonium salt type surfactant, serving as a neutralizing agent in a case of preparing a resin particle dispersion liquid using a phase inversion emulsification method.

Net Intensity of Na Element

The Net intensity of the Na element in the fluorescent X-ray analysis is 0.50 kcps or less.

From the viewpoint of further improving the charge stability in a high-temperature and high-humidity environment, the Net intensity of the Na element in the fluorescent X-ray analysis is, for example, preferably 0.45 kcps or less, more preferably 0.4 kcps or less, and still more preferably 0.30 kcps or less.

The Net intensity of the Na element is, for example, most preferably 0.00 kcps, but may be, for example, 0.10 kcps or more from the viewpoint of improving the manufacturing efficiency of the toner.

The Net intensity of the Na element in fluorescent X-ray analysis is measured in the following manner.

0.12 g of toner particles are compressed by a load of 6 t and pressurization for 60 seconds using a compression molding machine to prepare a disc having a diameter of 50 mm and a thickness of 2 mm. The Net intensity of the Na element is measured, using this disc as a sample, by performing all elemental analysis with a fluorescent X-ray analyzer (XRF-1500, manufactured by Shimadzu Corporation) under the measurement conditions of a tube voltage of 40 KV and a tube current of 70 mA.

Examples of the supply source of the Na element include sulfonate-based anionic surfactants such as sodium dodecylbenzenesulfonate.

Net Intensity of S Element

The Net intensity of the S element in the fluorescent X-ray analysis is 1.50 kcps or less.

From the viewpoint of further improving the transfer efficiency, the Net intensity of the S element in the fluorescent X-ray analysis is, for example, preferably 1.45 kcps or less, more preferably 1.40 kcps or less, and still more preferably 1.30 kcps or less.

The Net intensity of the S element is, for example, most preferably 0.00 kcps, but may be, for example, 0.10 kcps or more from the viewpoint of improving the manufacturing efficiency of the toner.

The Net intensity of the S element in the fluorescent X-ray analysis is measured in the same manner as the Net intensity of the Na element.

Examples of the supply source of the S element include an additive containing sulfur (such as a surfactant or an aggregating agent). Specifically, examples of the supply source of the S element include a sulfuric acid ester salt-based anionic surfactant, a sulfonate-based anionic surfactant, and a metal salt such as aluminum sulfate.

Configuration of Toner

The toner according to the present exemplary embodiment contains toner particles and, as necessary, an external additive.

The toner particles contain, for example, a binder resin, and a colorant, a release agent, and other additives as necessary.

The binder resin, the colorant, the release agent, other additives, and the external additive contained in the toner particles are not particularly limited, and examples thereof include the binder resin, the colorant, the release agent, other additives, and the external additive known in the related art, which are used for a toner.

Characteristics of Toner Particles and the Like

The toner particles may be toner particles having a single layer structure or toner particles having a so-called core-shell structure formed of a core portion (core particle) and a coating layer (shell layer) covering the core portion.

Here, the toner particles having a core-shell structure may be formed of, for example, a core portion containing a binder resin and, as necessary, other additives such as a colorant and a release agent, and a coating layer containing a binder resin.

The volume average particle diameter (D50v) of the toner particles is, for example, preferably 2 μm or more and 10 μm or less and more preferably 3 μm or more and 8 μm or less.

Further, various average particle diameters and various particle size distribution indices of the toner particles are measured using Coulter Multisizer II (manufactured by Beckman Coulter Inc.) and ISOTON-II (manufactured by Beckman Coulter Inc.) as an electrolytic solution.

During the measurement, 0.5 mg or more and 50 mg or less of a measurement sample is added to 2 ml of a 5% aqueous solution of a surfactant (for example, preferably sodium alkylbenzene sulfonate) as a dispersant. The solution is added to 100 ml or more and 150 ml or less of the electrolytic solution.

The electrolytic solution in which the sample is suspended is subjected to a dispersion treatment for 1 minute with an ultrasonic disperser, and the particle size distribution of particles having a particle diameter in the range of 2 μm or more and 60 μm or less is measured by a Coulter Multisizer II using an aperture with an aperture diameter of 100 μm. Further, the number of particles to be sampled is 50000.

Cumulative distribution of the volume and the number is drawn from the small diameter side for each particle size range (channel) divided based on the particle size distribution to be measured, and the particle diameter at a cumulative 16% is defined as the volume particle diameter D16v and the number particle diameter D16p, the particle diameter at a cumulative 50% is defined as the volume average particle diameter D50v and the cumulative number average particle diameter D50p, and the particle diameter at a cumulative 84% is defined as the volume particle diameter D84v and the number particle diameter D84p.

Based on the description above, the volume particle size distribution index (GSDv) is calculated as $(D84v/D16v)^{1/2}$, and the number particle size distribution index (GSDp) is calculated as $(D84p/D16p)^{1/2}$.

The average circularity of the toner particles is, for example, preferably 0.94 or more and 1.00 or less and more preferably 0.95 or more and 0.98 or less.

The average circularity of the toner particles is acquired by (perimeter equivalent to circle)/(perimeter) [(perimeter of circle having same projected area as particle image)/(perimeter of projected particle image)]. Specifically, the average circularity is a value measured by the following method.

First, the average circularity is acquired by a flow type particle image analyzer (FPIA-3000, manufactured by Sysmex Corporation) that sucks and collects toner particles to be measured, forms a flat flow, instantly emits strobe light so that a particle image is captured as a still image, and analyzes the particle image. Further, the number of samples in a case of calculating the average circularity is set to 3500.

Further, in a case where the toner has an external additive, the toner (developer) to be measured is dispersed in water containing a surfactant, and an ultrasonic treatment is performed, thereby obtaining toner particles from which the external additive has been removed.

EXAMPLES

Hereinafter, exemplary embodiments will be described based on examples, but the present invention is not limited to the examples. Further, in the following description, "parts" and "%" are on a mass basis unless otherwise specified.

Preparation of Various Dispersion Liquids

Preparation of Polyester Resin Particle Dispersion Liquid

Synthesis of Polyester Resin 80 parts by mole of polyoxypropylene (2,2)-2,2-bis(4-hydroxyphenyl)propane, 10 parts by mole of ethylene glycol, 10 parts by mole of cyclohexanediol, 80 parts by mole of terephthalic acid, 10 parts by mole of isophthalic acid, and 10 parts by mole of n-dodecenyl succinic acid are put into a reaction container provided with a stirrer, a thermometer, a condenser, and a nitrogen gas introduction tube, and the inside of the reaction container is substituted with dry nitrogen gas. Thereafter, 0.25 parts by mass of titanium tetrabutoxide serving as a catalyst is put into 100 parts by mass of the monomer component. The mixture is stirred and allowed to react at 170° C. for 3 hours in a nitrogen gas stream and heated to a temperature of 210° C. for 1 hour, the inside of the reaction container is reduced to 3 kPa, and the mixture is stirred and allowed to react under reduced pressure for 13 hours, thereby obtaining a polyester resin. The glass transition temperature of the obtained resin is measured using a differential scanning calorimeter (DSC), and the temperature is 58° C.

Preparation of Dispersion Liquid

Polyester resin: 100 parts by mass
Ethyl acetate: 70 parts by mass
Isopropyl alcohol: 15 parts by mass A mixed solvent of the ethyl acetate and the isopropyl alcohol is put into a stainless steel container provided with a jacket, and the polyester resin is gradually put into the container and stirred so as to be fully dissolved, thereby obtaining an oil phase. A 10 mass % ammonia aqueous solution is gradually added dropwise, using a pump, to the oil phase while being stirred such that the content thereof reaches a total of 3 parts by mass, and 230 parts by mass of ion exchange water is further gradually added dropwise thereto at a rate of 10 L/min for phase inversion emulsification. Thereafter, vacuum distillation is carried out, thereby obtaining a resin dispersion liquid 1 containing polyester resin particles (concentration of solid contents: 40% by mass). The concentration of solid contents is measured using a moisture content meter MA35 (manufactured by Sartorius Mechatronics Japan Co., Ltd.). The concentration of solid contents of each sample described below is measured in the same manner as described above.

The volume average particle diameter (D50v) of the polyester resin particles in the obtained first dispersion is 180 nm.

Preparation of Release Agent Dispersion Liquid

Paraffin wax (FNP92, manufactured by Nippon Seiro Co., Ltd., endothermic peak onset at 81° C.): 45 parts
Anionic surfactant (NEOGEN RK, manufactured by DKS Co., Ltd.): 5 parts
Ion exchange water: 200 parts The above-described materials are mixed, heated to 95° C., and dispersed using a homogenizer (ULTRA-TURRAX T50, manufactured by IKA). Thereafter, the mixture is subjected to a dispersion treatment using a Manton Gaulin high-pressure homogenizer (manufactured by Gaulin) such that the release agent is dispersed, thereby preparing a release agent dispersion liquid 1 (concentration of solid contents: 20%). The volume average particle diameter of the release agent particles is 0.19 μm.

Preparation of Colorant Dispersion Liquid

Cyan pigment (Pigment Blue 15:3 (copper phthalocyanine), manufactured by Dainichiseika Color & Chemicals Mfg. Co., Ltd.): 98 parts
Anionic surfactant (NEOGEN R, manufactured by DKS Co., Ltd.): 2 parts
Ion exchange water: 400 parts The above-described materials are mixed and dispersed using a homogenizer (ULTRA-TURRAX, manufactured by IKA) for 10 minutes, thereby obtaining a colorant dispersion liquid having a volume average particle diameter of 0.16 μm and a solid content amount of 20%.

Preparation of Toner Particle-Containing Slurry

Polyester resin particle dispersion liquid: 100 parts by mass
Colorant particle dispersion liquid: 10 parts by mass
Release agent particle dispersion liquid: 9 parts by mass
Ion exchange water: 200 parts by mass The raw materials are put into a tank having a jacket which is capable of performing heating and cooling, and 3 parts of a 0.3 M nitric acid aqueous solution is added thereto so that the pH is adjusted to 3.0. Next, 50 parts of a 10% aluminum sulfate aqueous solution is added dropwise thereto as an aggregating agent while the solution is allowed to circulate via a disperser (Cavitron manufactured by Pacific Machinery & Engineering Co., Ltd.) installed outside the stirring tank, and mixed and dispersed, and the solution is heated at a jacket temperature of 50° C. while being stirred with a stirring blade, thereby obtaining aggregating particles. Thereafter, a mixture of 25 parts of the polyester resin dispersion liquid and 10 parts of ion exchange water is added to a resin particle dispersion liquid for coating which has been adjusted to have a pH of 3.0 in advance, for coating the aggregated particles, and the solution is maintained for 10 minutes. Thereafter, a 1 M sodium hydroxide aqueous solution is added thereto in order to stop the growth of the coated aggregated particles, and the pH of the solution is controlled to 8.0. Next, the solution is heated to 96° C. at a temperature rising rate of 1° C./min in order to fuse the coated aggregated particles and maintained for 4 hours after the temperature thereof reaches 90° C. Thereafter, the solution is cooled to 40° C., thereby obtaining a coarse toner particle-containing slurry. The volume average particle diameter of the coarse toner particles contained in the coarse toner particle-containing slurry is 6.0 μm. Further, the coarse toner particle-containing slurry is sieved with a net having an opening size of 25 μm, thereby obtaining a toner particle-containing slurry.

Example 1

First Step

The obtained toner particle-containing slurry is supplied to a filter press (manufactured by Tokyo Engineering Co., Ltd.) and filtered to form a cake layer.

Second Step

Next, the cake layer is squeezed at a pressure of 0.3 MPa, and 1500 parts by mass of deionized water adjusted to have a temperature of 15° C. with respect to the toner particles is made to pass through 100 parts by mass of the toner particles. The conductivity of the filtrate after 1500 parts by mass of water is made to pass through the particles is 0.05 mS/cm.

Third Step

Next, the cake layer is squeezed at a pressure of 0.7 MPa. Thereafter, the operation of ventilating compressed air at 0.4 MPa for 120 seconds is performed once. The amount of moisture contained in the toner particles in the cake layer is measured, and the amount thereof is 40% by mass with respect to the entirety of the toner particles.

Drying Step

Thereafter, the cake layer is taken out and dried, thereby obtaining toner particles. The obtained toner particles has a volume average particle diameter of 5.9 μm.

External Addition Step 100 parts of the toner particles and 1.5 parts of hydrophobic silica (RY50 manufactured by Nippon Aerosil Co., Ltd.) are mixed with each other using a sample mill at a rotation speed of 13000 rpm for 30 seconds. The mixture is sieved with a vibrating sieve having an opening size of 45 μm, thereby obtaining a toner.

Examples 2 to 4 and Comparative Examples 1 to 6

Each toner is manufactured in the same manner as in Example 1 except that the second step and the third step are changed to be performed under the conditions listed in Table 1.

Evaluation

A developing device of a modified machine "DocuCenterColor400 (manufactured by Fuji Xerox Co., Ltd.)" is filled with the developer prepared by the following procedure, and the charge stability and the transfer efficiency are evaluated.

Preparation Procedure for Developer

Preparation of Carrier 100 parts of ferrite particles (manufactured by Powder Tech K. K., average particle diameter of 50 μm), 1.5 parts of a polymethyl methacrylate resin (manufactured by Mitsubishi Rayon Co., Ltd., weight-average molecular weight of 95000, the proportion of components with a weight-average molecular weight of 10000 or less is 5%), and 500 parts of toluene are added to a pressurized kneader, stirred and mixed at room temperature for 15 minutes, heated to 70° C. while being mixed under reduced pressure so that the toluene is distilled off, and cooled, and classified using a sieve having an opening size of 105 μm, thereby obtaining a resin-coated carrier.

Preparation of Developer 10 parts of the toner obtained in each example and 100 parts of the resin-coated carrier are added to a V-type blender and stirred for 20 minutes and sieved with a vibrating sieve having an opening size of 212 μm, thereby obtaining a developer.

Evaluation of Charge Stability

A developing device is filled with the developer, the developer is allowed to stand in each environment (high-temperature and high humidity: 30° C. and 85% RH, low-temperature and low-humidity environment: 10° C. and 15% RH) for 24 hours or longer, and the developing device is idled for 3 minutes in the same environment. The charge amount of the developer is measured using a blow-off powder charge amount measuring device (TB-200, manufactured by Toshiba Chemical Co., Ltd.). The evaluation standards for the charge stability are as follows.

A: (Charge value in high-temperature and high-humidity environment/charge value in low-temperature and low-humidity environment) is 0.7 or more B: (Charge value in high-temperature and high-humidity environment/charge value in low-temperature and low-humidity environment) is 0.5 or more and less than 0.7

C: (Charge value in high-temperature and high-humidity environment/charge value in low-temperature and low-humidity environment) is less than 0.5

Evaluation of Transfer Efficiency

As the test procedure, first, the development potential is adjusted such that the toner loading amount on the photoreceptor reaches 5 $g/m^2$ in an environment of a temperature of 10° C. and a humidity of 20% RH. Next, the evaluation machine is stopped immediately after the developed toner on the photoreceptor is transferred to the intermediate transfer member (intermediate transfer belt). In this manner, the toner remains on the photoreceptor in the state of after the transfer (before the cleaning). The toner is taken with a mending tape, and the toner weight at this time is measured. The transfer efficiency is acquired based on the following equation from the ratio between the toner loading amount during the development and the toner loading amount after the transfer. The transfer efficiency is measured after 50000 sheets of A4 paper with an image having an image area of 5% are continuously output.

Transfer efficiency=Toner loading amount on paper after transfer/toner loading amount on photoreceptor×100 Equation:

The evaluation standards for the transfer efficiency are as follows.

A: The transfer efficiency is 98% or more

B: The transfer efficiency is 95% or more and less than 98%

C: The transfer efficiency is 90% or more and less than 95%

D: The transfer efficiency is less than 90%

TABLE 1-1

| | Second step | | | | Third step | | | |
|---|---|---|---|---|---|---|---|---|
| | Squeezing pressure P1 (MPa) | Temperature T of deionized water (° C.) | Amount of deionized water allowed to pass through particles (parts, with respect to 100 parts of toner particles) | Conductivity of filtrate after completion of passing water (mS/cm) | Squeezing pressure P2 (MPa) | Pressure of compressed air (MPa) | Ventilation time (sec) | Number of times of performing ventilation (times) |
| Example 1 | 0.3 | 15 | 1500 | 0.05 | 0.7 | 0.4 | 120 | 1 |
| Example 2 | 0.4 | 15 | 1500 | 0.05 | 0.5 | 0.4 | 120 | 1 |
| Example 3 | 0.3 | 30 | 1500 | 0.04 | 0.7 | 0.4 | 120 | 1 |
| Example 4 | 0.4 | 30 | 1500 | 0.05 | 0.5 | 0.4 | 120 | 1 |
| Comparative Example 1 | 0.3 | 5 | 1500 | 0.15 | 0.3 | 0.4 | 120 | 1 |
| Comparative Example 2 | 0.3 | 40 | 1500 | 0.05 | 0.3 | 0.4 | 120 | 1 |
| Comparative Example 3 | 0.5 | 20 | 1500 | 0.14 | 0.3 | 0.4 | 120 | 1 |
| Comparative Example 4 | 0.1 | 20 | 1500 | 0.11 | 0.3 | 0.4 | 120 | 1 |
| Comparative Example 5 | 0.5 | 20 | 1500 | 0.3 | 0.5 | 0.4 | 120 | 1 |
| Comparative Example 6 | 0.4 | 20 | 1500 | 0.15 | 1 | 0.4 | 120 | 1 |

TABLE 1-1-continued

| | | | | | | | | |
|---|---|---|---|---|---|---|---|---|
| Comparative Example 7 | 0.4 | 9 | 1500 | 0.12 | 0.6 | 0.4 | 120 | 1 |
| Example 5 | 0.4 | 10 | 1500 | 0.08 | 0.6 | 0.4 | 120 | 1 |
| Example 6 | 0.4 | 34 | 1500 | 0.06 | 0.6 | 0.4 | 120 | 1 |
| Comparative Example 8 | 0.4 | 36 | 1500 | 0.06 | 0.6 | 0.4 | 120 | 1 |
| Comparative Example 9 | 0.4 | 20 | 1500 | 0.07 | 0.9 | 0.4 | 120 | 1 |

| | Third step Amount of moisture | | Toner | | | | |
|---|---|---|---|---|---|---|---|
| | (% by mass, with respect to toner particles) | Difference in pressure P2 − P1 (MPa) | Content of ammonium ion (mg/L) | Net intensity of Na (kcps) | Net intensity of S (kcps) | Evaluation Charge stability | Transfer efficiency |
| Example 1 | 35 | 0.4 | 0.53 | 0.17 | 0.69 | B | B |
| Example 2 | 38 | 0.1 | 0.61 | 0.22 | 0.89 | B | B |
| Example 3 | 33 | 0.4 | 0.31 | 0.16 | 0.57 | A | A |
| Example 4 | 37 | 0.1 | 0.25 | 0.13 | 0.50 | A | A |
| Comparative Example 1 | 45 | 0 | 1.20 | 0.62 | 1.65 | C | C |
| Comparative Example 2 | 44 | 0 | 1.1 | 0.58 | 1.61 | C | D |
| Comparative Example 3 | 46 | 0 | 1.50 | 0.61 | 1.52 | C | C |
| Comparative Example 4 | 50 | −0.2 | 1.34 | 0.66 | 1.53 | C | C |
| Comparative Example 5 | 55 | 0.4 | 2.1 | 0.8 | 1.77 | C | D |
| Comparative Example 6 | 42 | 0.5 | 1.32 | 0.60 | 1.66 | C | D |
| Comparative Example 7 | 37 | 0.2 | 1.1 | 0.55 | 1.57 | C | C |
| Example 5 | 36 | 0.2 | 0.85 | 0.46 | 1.1 | B | B |
| Example 6 | 36 | 0.2 | 0.25 | 0.13 | 0.45 | B | B |
| Comparative Example 8 | 37 | 0.2 | 0.35 | 0.41 | 0.75 | B | D |
| Comparative Example 9 | 35 | 0.5 | 0.4 | 0.38 | 0.66 | B | D |

TABLE 1-2

| | Second step | | | | Third step | | | |
|---|---|---|---|---|---|---|---|---|
| | Squeezing pressure P1 (MPa) | Temperature T of deionized water (° C.) | Amount of deionized water allowed to pass through particles (parts, with respect to 100 parts of toner particles) | Conductivity of filtrate after completion of passing water (mS/cm) | Squeezing pressure P2 (MPa) | Pressure of compressed air (MPa) | Ventilation time (sec) | Number of times of performing ventilation (times) |
| Example 7 | 0.4 | 20 | 590 | 0.11 | 0.6 | 0.4 | 120 | 1 |
| Example 8 | 0.4 | 20 | 600 | 0.10 | 0.6 | 0.4 | 120 | 1 |
| Example 9 | 0.3 | 20 | 1500 | 0.08 | 0.72 | 0.4 | 120 | 1 |
| Example 10 | 0.3 | 20 | 1500 | 0.08 | 0.68 | 0.4 | 120 | 1 |
| Example 11 | 0.3 | 20 | 1500 | 0.08 | 0.42 | 0.4 | 120 | 1 |
| Example 12 | 0.3 | 20 | 1500 | 0.08 | 0.38 | 0.4 | 120 | 1 |
| Example 13 | 0.4 | 20 | 1500 | 0.07 | 0.6 | 0.4 | 50 | 1 |
| Example 14 | 0.4 | 20 | 1500 | 0.08 | 0.6 | 0.4 | 60 | 1 |
| Example 15 | 0.4 | 20 | 1500 | 0.07 | 0.6 | 0.1 | 120 | 1 |
| Example 16 | 0.4 | 20 | 1500 | 0.07 | 0.6 | 0.2 | 120 | 1 |
| Example 17 | 0.4 | 20 | 1500 | 0.07 | 0.6 | 0.6 | 120 | 1 |
| Example 18 | 0.4 | 20 | 1500 | 0.07 | 0.6 | 0.7 | 120 | 1 |
| Example 19 | 0.4 | 20 | 1500 | 0.07 | 0.6 | 0.3 | 60 | 2 |
| Example 20 | 0.4 | 20 | 1500 | 0.07 | 0.6 | 0.3 | 60 | 3 |

TABLE 1-2-continued

| | Third step Amount of moisture (% by mass, with respect to toner particles) | Difference in pressure P2 − P1 (MPa) | Toner: Content of ammonium ion (mg/L) | Toner: Net intensity of Na (kcps) | Toner: Net intensity of S (kcps) | Evaluation: Charge stability | Evaluation: Transfer efficiency |
|---|---|---|---|---|---|---|---|
| Example 7 | 37 | 0.2 | 0.95 | 0.46 | 1.44 | B | B |
| Example 8 | 37 | 0.2 | 0.9 | 0.44 | 1.35 | A | B |
| Example 9 | 37 | 0.42 | 0.66 | 0.25 | 0.78 | B | B |
| Example 10 | 35 | 0.38 | 0.31 | 0.16 | 0.57 | A | A |
| Example 11 | 41 | 0.12 | 0.31 | 0.16 | 0.57 | A | A |
| Example 12 | 43 | 0.08 | 0.71 | 0.34 | 0.88 | A | B |
| Example 13 | 37 | 0.2 | 0.65 | 0.32 | 0.91 | A | B |
| Example 14 | 35 | 0.2 | 0.69 | 0.36 | 0.85 | A | B |
| Example 15 | 47 | 0.2 | 0.72 | 0.41 | 0.81 | A | B |
| Example 16 | 45 | 0.2 | 0.32 | 0.18 | 0.6 | A | A |
| Example 17 | 36 | 0.2 | 0.3 | 0.15 | 0.51 | A | A |
| Example 18 | 34 | 0.2 | 0.63 | 0.39 | 0.79 | A | B |
| Example 19 | 33 | 0.2 | 0.29 | 0.16 | 0.47 | A | A |
| Example 20 | 32 | 0.2 | 0.26 | 0.11 | 0.45 | A | A |

Based on the above-described results, it may be seen that a toner having excellent charge stability and high transfer efficiency is obtained by the toner manufacturing method of the present example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A toner manufacturing method comprising:

a first step of filtering toner particles obtained by a wet manufacturing method, wherein a pressure of 0.2 MPa or more and 0.7 MPa or less is applied to the toner particles in the first step;

a second step of squeezing the toner particles and making water pass through the toner particles; and a third step of squeezing the toner particles and ventilating compressed air through the toner particles, wherein the compressed air is ventilated through a pipe connected to a filter chamber, wherein Condition (1) and Condition (2) are satisfied, Condition (1): a temperature T of the water passing through the toner particles in the second step satisfies "10° C.≤T≤35° C."; and Condition (2): a squeezing pressure P1 in the second step and a squeezing pressure P2 in the third step satisfy "0.2 MPa≤P1<P2≤0.8 MPa".

2. The toner manufacturing method according to claim 1, wherein in the second step, the water is made to pass through the toner particles until a conductivity of a filtrate reaches 0.10 mS/cm or less.

3. The toner manufacturing method according to claim 2, wherein an amount of the water passing through the toner particles in the second step is 600 parts by mass or more with respect to 100 parts by mass of the toner particles.

4. The toner manufacturing method according to claim 1, wherein a difference between the squeezing pressure P1 in the second step and the squeezing pressure P2 in the third step (P2−P1) is 0.05 MPa or more and 0.4 MPa or less.

5. The toner manufacturing method according to claim 1, wherein a ventilation time in the third step is 60 seconds or longer.

6. The toner manufacturing method according to claim 5, wherein a pressure of the compressed air in the third step is 0.2 MPa or more and 0.6 MPa or less.

7. The toner manufacturing method according to claim 1, wherein the compressed air is ventilated a plurality of times in the third step.

8. The toner manufacturing method according to claim 1, wherein in the third step, the compressed air is ventilated through the toner particles such that an amount of moisture contained in the toner particles is 45% by mass or less with respect to an entirety of the toner particles.

9. The toner manufacturing method according to claim 1, wherein a content of an ammonium ion measured by the following procedure is 1.0 mg/L or less, and in fluorescent X-ray analysis, a Net intensity of a Na element is 0.50 kcps or less, and a Net intensity of a S element is 1.50 kcps or less, (measurement procedure for content of ammonium ion)

0.5 g of the toner particles are weighed, dispersed in 100 g of ion exchange water containing 0.1 g of a nonionic surfactant corresponding to 20% by mass with respect to an entirety of the toner particles, and dispersed for 30 minutes with an ultrasonic disperser in a thermostatic bath controlled to have a temperature of 30±1° C., a liquid after the ultrasonic dispersion is subjected to solid-liquid separation by suction filtration to remove the toner particles, the amount of ammonium contained in the obtained filtrate is measured by ion chromatography, and analysis is performed under the following conditions using ICS-2000 (manufactured by Nippon Dionex K. K.) as the ion chromatography, Cation separation column: IonPacCS12A, manufactured by Nippon Dionex K. K, Cation guard column: IonPacCG12A, manufactured by Nippon Dionex K. K, Eluent: 20 mM (mmol/l) of methanesulfonic acid Flow rate: 1 ml/min Temperature: 30° C.

Detection method: electrical conductivity method (suppressor type).

10. The toner manufacturing method according to claim 1, wherein in the first step, a filtration area is 30 $m^2$ or more and 200 $m^2$ or less.

* * * * *